Oct. 29, 1935.    B. E. HOUSE    2,018,915
BRAKE OPERATING MECHANISM
Filed June 4, 1934
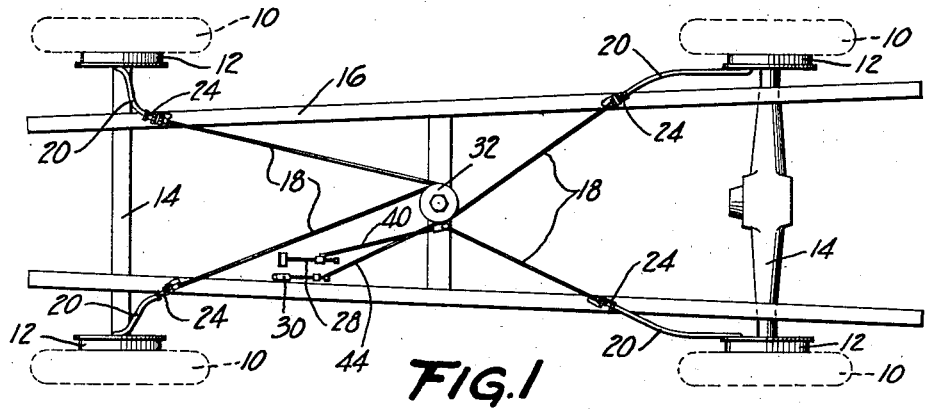
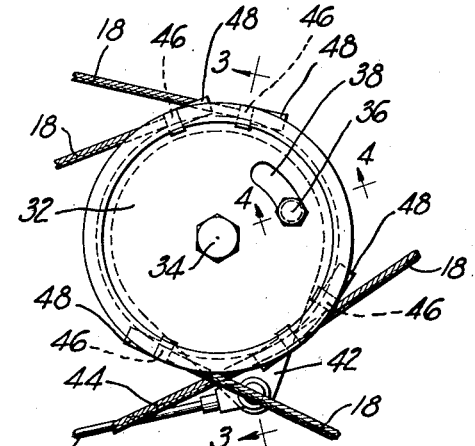
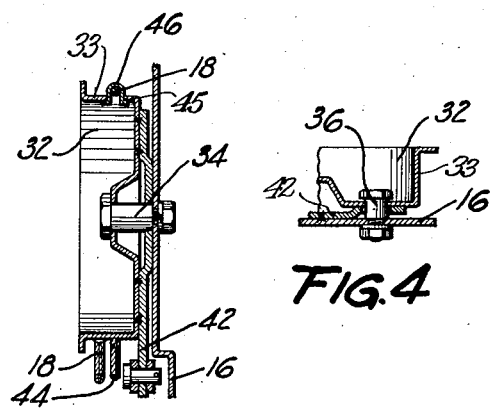
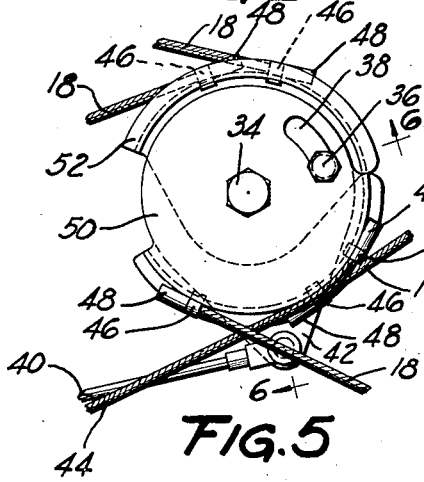
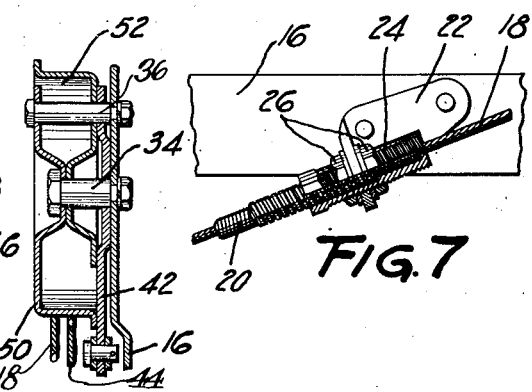
INVENTOR.
BRYAN E. HOUSE
BY
ATTORNEY Patented Oct. 29, 1935

2,018,915

UNITED STATES PATENT OFFICE 2,018,915

BRAKE OPERATING MECHANISM

Bryan E. House, South Bend, Ind., assignor to Bendix Products Corporation, South Bend, Ind., a corporation of Indiana Application June 4, 1934, Serial No. 728,870

2 Claims. (Cl. 188—106)

This invention relates to brakes, and is illustrated as embodied in a novel mechanical system of operating connections for a set of four-wheel brakes.

An object of the invention is to provide a very simple, inexpensive, and easily assembled device by means of which the driver may operate the brakes. Preferably I utilize a simple rotatable drum turning on a vertical axis, and which may conveniently be stamped from sheet steel, and which is shown with a peripheral cylindrical flange.

The operating means and the four brake connections are all connected to this flange, the usual arrangement including a pedal and a lever or other emergency member independently connected thereto. According to one feature of the invention, a simple connection to this flange is provided by forming therein circumferentially-extending slots in which are seated novel clips embracing the adjacent cables or other connections.

Preferably the drum has two members on which it is mounted, and either of which will support it even if the other one is damaged.

Another feature of the invention relates to adjusting the operating cables or their equivalents by shifting relatively to the frame the conduits which enclose the portions of the cables between the frame and the respective brakes. This changes the effective lengths of the cables so far as concerns their effect on the brakes. I prefer to provide for this purpose adjustable conduit abutments mounted on the frame, and which in the form illustrated themselves embody substantial novelty.

The above and other objects and features of the invention, including various novel combinations and desirable particular constructions, will be apparent from the following description of the illustrative embodiment shown in the accompanying drawing, in which:

Figure 1 is a diagrammatic top plan view of an automobile chassis embodying my invention;

Figure 2 is an enlarged top plan view of the centrally-arranged operating means including the above-described drum;

Figure 3 is a section therethrough on the line 3—3 of Figure 2;

Figure 4 is a partial section therethrough on the line 4—4 of Figure 2;

Figure 5 is a view corresponding to Figure 2 but showing a modified construction;

Figure 6 is a section therethrough on the line 6—6 of Figure 5; and

Figure 7 is an enlarged elevation showing one of the conduit abutments.

The illustrated chassis includes front and rear road wheels 10, each provided with a brake 12, and arranged to support (through front and rear axles 14 and the usual vehicle springs) a chassis frame 16.

The four brakes are applied respectively by connections such as flexible steel cables 18, the portion of each cable between its brake and the frame being enclosed in a flexible Bowden-type conduit 20. The brake end of each conduit 20 seats against the brake backing plate, while the cable 18 passes from the brake end of its conduit directly through the backing plate into the interior of the brake, where it is connected to a lever or other applying device which operates the brake.

The adjustment of the effective lengths of the cables 18, to equalize the pressures on the four brakes, is according to one feature of the invention made by shifting the frame ends of the conduits 20 relative to the frame 16.

The novel abutment illustrated for this purpose is shown in detail in Figure 7, and includes a bracket 22 secured to the frame 16 and formed with an opening for an externally-threaded conduit-engaging abutment tube 24 engaging the frame end of the conduit, and through which the cable 18 passes.

The tube 24 is shown with a hexagonal head at one end, and it is adjustably secured to the bracket 22 by means such as two nuts 26 threaded on the tube and embracing the bracket between them. The adjustment is made by backing off one nut 26 and then tightening up the other.

The brakes are applied, from driver operated means such as a pedal 28 and an emergency lever 30, by a novel horizontal drum 32 rotatable about a vertical axis and formed with a generally-cylindrical peripheral flange 33 to which the various connections are all attached. Preferably the drum 32 is mounted on the frame 16 by a central pivot 34 and also by a post or the like 36 passing through an arcuate slot 38, either of the supports 34 or 36 being adequate to support the drum if the other is damaged.

The pedal 28 is shown connected, by a cable 40 or the like, to a stamped lever 42 welded or otherwise secured to the head of the drum 32. The lever 30 is shown connected, by means such as a cable 44, to the peripheral flange of the drum, in the same manner as described below for cables 18. Since cables 40 and 44 are flexible, the pedal and hand lever can be operated independently of each other, although overrunning joints may be provided if desired.

As a convenient means of attaching cables 18 and 44 to the peripheral flange of drum 32, the flange may be formed with circumferentially extending slots 45 embracing novel clips 46. Each clip 46 has a channel-shaped part extending through the slot and embracing the cable end and outwardly-extending lugs which seat against the inner face of the drum flange as shown in Figure 3. Each cable has an abutment or sleeve 48 swaged on or otherwise secured to its end, and which engages the corresponding clip 46.

The parts are assembled by forcing a portion of the cable, near its end, through one of the slots, then placing a clip 46 thereon, pulling the cable with the clip back out through the slot to the position of Figure 3, and then pulling the cable lengthwise until the abutment 48 engages the clip 46.

It should be noted that the cables 18 for the front brakes are secured to the drum 32 at one side of its axis, and those for the rear brakes at the opposite side, so that rotation of the drum tensions all four cables by wrapping them about the drum.

When the brakes are in released position, the cables are all tangent to the drum flange, i. e., they are straight, so that they do not acquire any "set" curvature which might make brake adjustment difficult. This relationship is facilitated by providing adjustments, such as that shown in Figure 7, which act on the conduits instead of directly on the cables.

In the modification of Figures 5 and 6, the drum 32 is replaced by two partial drums 50 and 52, which may be welded or otherwise secured together if desired, and one of which is connected to the front brakes and the other to the rear brakes; also one of these is connected to the hand lever and the other one (or both of them) to the lever 42 which is operated by the pedal. Thus there is no single part which can give way, even in a very serious accident, without leaving either the front brakes or the rear brakes fully operative.

While illustrative embodiments have been described in detail, it is not my intention to limit the scope of the invention to those particular embodiments, or otherwise than by the terms of the appended claims.

I claim:

1. Brake-operating means comprising a horizontal drum rotatable about a vertical axis and having a generally cylindrical flange, a pedal and an emergency operator independently connected to said drum, and a plurality of brake-operating connections connected to said flange and wrapping upon said flange in applying the brakes, said drum having a central pivot and a member at one side of its center and either of which will support it in applying the brakes.

2. Brake-operating means comprising a drum having a flange formed with slots extending circumferentially thereof, connections adjacent said slots, and clips embracing said connections and seated in said slots in a manner interlocking them with said flange.

BRYAN E. HOUSE.